United States Patent
Hayashi et al.

[11] Patent Number: 5,912,512
[45] Date of Patent: Jun. 15, 1999

[54] ENGINE START CONTROL APPARATUS

[75] Inventors: Kazuhiko Hayashi; Naoki Toyofuku; Takayoshi Masutani, all of Aichi-ken, Japan

[73] Assignee: Toyota Jidosha Kabushiki Kaisha, Japan

[21] Appl. No.: 08/925,389

[22] Filed: Sep. 8, 1997

[30] Foreign Application Priority Data

Sep. 11, 1996 [JP] Japan .................................. 8-240386

[51] Int. Cl.$^6$ .................................................. B60R 25/04
[52] U.S. Cl. .................... 307/10.5; 307/10.2; 123/179.3; 340/426; 340/825.31
[58] Field of Search ................................. 307/9.1, 10.1, 307/10.2, 10.3, 10.4, 10.5, 10.6; 123/179.1, 179.2, 179.3, 179.4; 340/425.5, 426, 428, 825.3, 825.31, 825.34, 825.54, 825.69, 825.72; 701/1, 2, 29, 32, 36, 49; 180/287; 290/38 R, 36 R, 38 C

[56] References Cited

U.S. PATENT DOCUMENTS

| 5,184,584 | 2/1993 | Cantrell | 123/179.2 |
| 5,555,863 | 9/1996 | Kokubu | 123/179.3 |
| 5,612,578 | 3/1997 | Drew | 307/10.5 |

FOREIGN PATENT DOCUMENTS

| 6-71325 | 10/1994 | Japan . |
| 7-165018 | 6/1995 | Japan . |
| WO97/39238 | 10/1997 | WIPO . |

OTHER PUBLICATIONS

Automobile Technology Cases/Issuing No. 95603, Japan Automobile Manufacturers' Association Intellectual Property Session, Dec. 1, 1995.

*Primary Examiner*—Jeffrey Gaffin
*Assistant Examiner*—Jonathan Kaplan
*Attorney, Agent, or Firm*—Finnegan, Henderson, Farabow, Garrett & Dunner, L.L.P.

[57] ABSTRACT

An engine start control apparatus, includes a code storing device which stores a plurality of normal codes which indicate a normal vehicle key belonging to a vehicle and a key corresponding to the normal vehicle key, and an immobilizer which determines as to whether an inherent code input form one of a signal input device and an inherent code input device is included in the normal codes stored in the code storing device, and on the basis of the results of determination, the immobilizer controls permitting/prohibiting the starting of the engine. Therefore, when the normal code of the plurality of normal codes and the input inherent code match, the immobilizer permits the starting of the engine.

10 Claims, 5 Drawing Sheets

F I G. 2

| No. | CODE | NOTE |
|---|---|---|
| 1 | CODE_A | MASTER KEY |
| 2 | CODE_B | SPARE KEY 1 (SUB-KEY 1) |
| 3 | CODE_C | SPARE KEY 2 (SUB-KEY 2) |

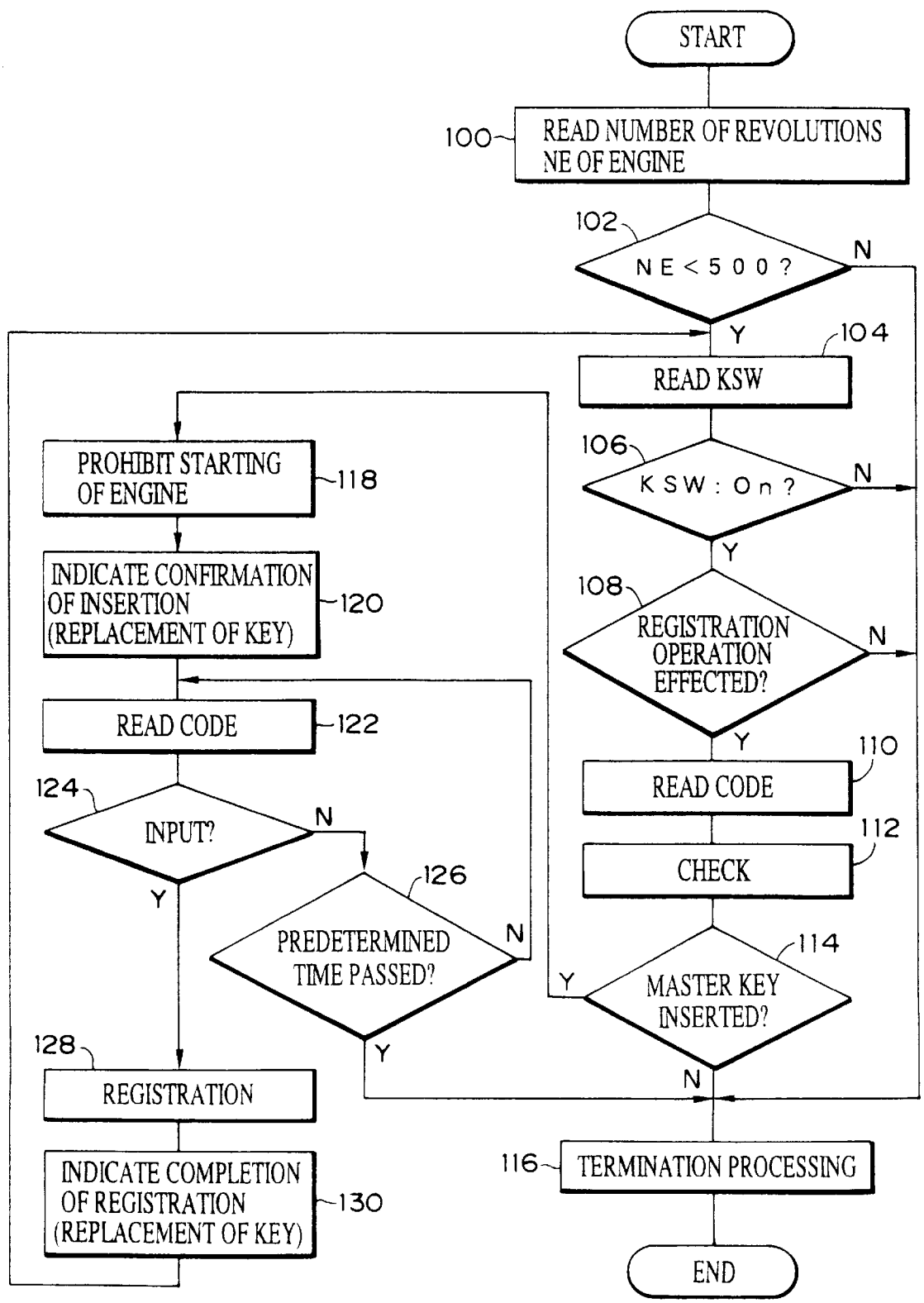
F I G. 3

F I G. 4
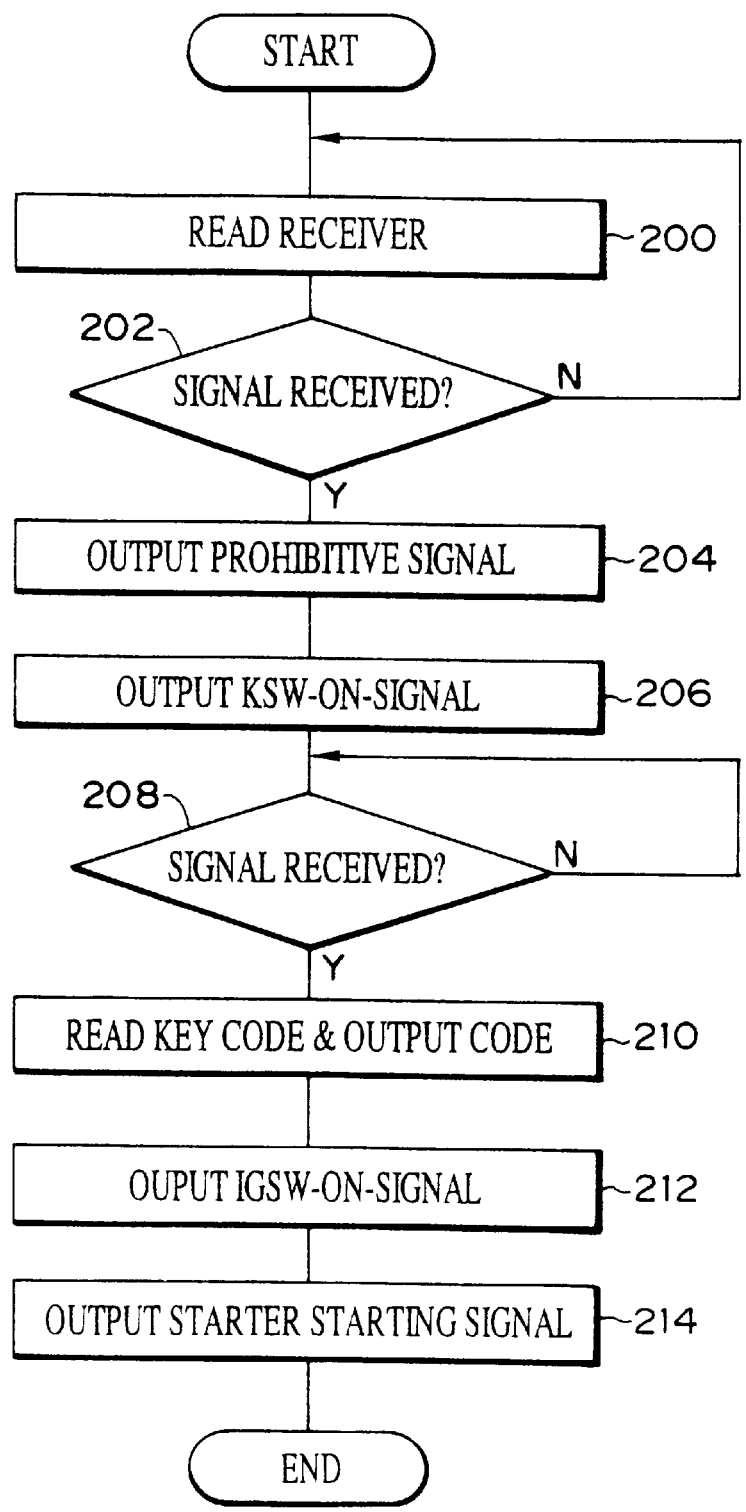

ENGINE START CONTROL APPARATUS

BACKGROUND OF THE INVENTION

1. Field of the Invention

The present invention relates to an engine start control apparatus, and in particular to an engine start control apparatus which controls the starting of an engine.

2. Description of the Related Art

In a vehicle such as an automobile, a lock device which is releasable by a vehicle key is provided at a door which can be opened and closed. Further, the engine of a vehicle can be started only by a normal ignition key. In order to prevent stealing in such a vehicle due to the starting of an engine by a similar key, a stealing preventing apparatus for a vehicle is known in which, when a normal ignition key is not used and is loaded into a key cylinder, the starting of the engine is prohibited. (Automobile Technology Cases/Issuing No. 95603: Japan Automobile Manufacturers' Association Intellectual Property Session, Dec. 1, 1995).

In recent years, a wireless starting device, in which an engine can be started by wireless from the outer side of a vehicle, has been practiced without using an ignition key. However, while the engine is started by wireless from the outer side of the vehicle by the wireless starting device so as to operate the engine, in a case in which the transmission is in drive or in neutral, the vehicle may move.

In order to solve the problem, an engine control device is proposed in which, in a case in which the ignition key is not loaded into the key cylinder and the engine is started by wireless, the engine is stopped due to the movement or the like of the vehicle (see Japanese Utility Model Application Laid-Open No. 6-71325).

However, in a vehicle which is provided with a stealing preventing apparatus for the vehicle in which, when the aforementioned normal ignition key is not used and the engine is started, the starting of the engine is prohibited if the above-described wireless starting device is attached and the engine is started from the outer side of the vehicle by wireless. Since the normal ignition key is not used, the starting of the engine is prohibited and the engine cannot be started from the outer side of the vehicle by wireless.

SUMMARY OF THE INVENTION

With the aforementioned in view, an object of the present invention is to provide an engine start control apparatus in which, while a security against stealing or the like is assured, an engine or the like can be started by a normal vehicle key and from a remote place.

In order to achieve the above-described object, a first aspect of the present invention is an engine start control apparatus, comprising: inherent code input means for inputting an inherent code recorded in and output from key means and which indicates that the key means is a vehicle key corresponding to the vehicle, signal input means, responsive to an engine starting command remote from the vehicle, for inputting a key code corresponding to the inherent code and for inputting a request signal for starting the engine of the vehicle, code storing means for storing a plurality of codes, including the key code and the inherent code, corresponding to the vehicle, and engine start controlling means. The engine start controlling means determines one of whether the key code input from the signal input means corresponds to the vehicle and to codes stored in the code storing means and whether the inherent code input from the inherent code input means corresponds to the vehicle and to codes stored in the code storing means. The engine start controlling means also starts the engine based on the results of the determination.

A second aspect of the present invention is an engine start control apparatus according to the first aspect, wherein said signal input means includes operating means remote from the vehicle for commanding starting of the engine, and engine start requesting means disposed on the vehicle. The engine start requesting means outputs, as an inherent code, a key code corresponding to an inherent code recorded onto a vehicle key corresponding to the vehicle, and requests starting of the engine as commanded by the remote operating means.

A third aspect of the present invention is an engine start control apparatus according to the first or second aspect, wherein the signal input means includes key code storing means, disposed on the vehicle, for storing a key code corresponding to an inherent code recorded onto a vehicle key corresponding to the vehicle, the signal input means outputting the key code stored in the key code storing means.

In the first aspect of the present invention, the inherent code input means inputs the inherent code which is output from the key means such as a vehicle key, and the inherent code indicates that the key means is the normal vehicle key belonging to the vehicle and is recorded in advance onto the key means. When the starting of engine of the vehicle is designated to the vehicle from the remote place, the key code is input to the signal input means as an inherent code. The key code corresponds to the inherent code which should be recorded onto the normal vehicle key. Further, the request signal which requests the starting of the engine designated from the remote place is input to the signal input means. As a device for designating the starting of engine of the vehicle from a remote place, there is a wireless starting device such as a remote engine starter or the like. Accordingly, for example, when the starting of engine of the vehicle is designated from the remote place by the wireless starting device, the key code corresponding to the inherent code, which has been recorded onto the normal vehicle key, is input to the signal input means. When the inherent code, which has been input from one of the signal input means and the inherent code input means, is included in the normal codes stored in the code storing means, the starting of engine by the normal vehicle key is requested or the starting of engine of the vehicle from the remote place is requested. The engine start permitting means determines as to whether the input inherent code is included in the normal codes. On the basis of the results of determination, when the inherent code is included in the normal codes, since the inherent code is a normal code, the engine start permitting means permits the starting of engine. On the other hand, when the inherent code is not included in the normal codes, the engine start permitting means does not permit the starting of engine. In this way, when the starting of engine of the vehicle is designated from the remote place and the key code corresponding to the inherent code which should be recorded onto the normal vehicle key is included in the normal codes, the engine start permitting means can permit the starting of engine. Therefore, while the security against stealing or the like is assured, the engine start control apparatus, which includes the engine start requesting means such as a wireless starting device or the like which starts the engine or the like from the remote place, is provided.

In the second aspect of the present invention, the starting of engine of the vehicle from the remote place is designated by the remote control means such as a wireless remote control or the like. The engine start requesting means operates in accordance with the designation of the remote operating means. The engine start requesting means is disposed on the vehicle and the key code corresponding to the inherent code which should be recorded onto the normal vehicle key belonging to the vehicle is output as the inherent code. Together with the key code, the engine start requesting means outputs the request signal which requests the starting of engine designated by the remote operating means. Therefore, the starting of engine of the vehicle is the only designation made from the remote place and the structure of the remote operating means can be made simple and easy. Consequently, while the security against stealing or the like is assured, the starting of engine can be designated from the remote place by the remote operating means having a simple and easy structure.

Further, as described in the third aspect, the signal input means includes the key code storing means which is disposed on the vehicle and which stores the key code corresponding to the inherent code which should be recorded onto the normal vehicle key belonging to the vehicle. As the key code is stored in this way, it is easy to output the key code corresponding to the inherent code which should be recorded onto the normal vehicle key belonging to the vehicle.

BRIEF DESCRIPTION OF THE DRAWINGS

FIG. 2 is an image view which shows inherent codes stored as normal codes.

FIG. 3 is a flowchart which shows the flow of a registration processing of a normal code referred to the stealing preventing apparatus for a vehicle.

FIG. 4 is a flowchart which shows the flow of processing of a remote engine starting device.

DESCRIPTION OF THE PREFERRED EMBODIMENTS

An embodiment of the present invention will be described in detail hereinafter with reference to the drawings. In the present embodiment, an engine start control apparatus of the present invention is applied to a stealing preventing apparatus for a vehicle equipped with an imobilizer electronic control unit (hereinafter, "imobilizer ECU"), in which the starting of an engine or the like is prohibited when a normal ignition key is not used.

Figure 1:
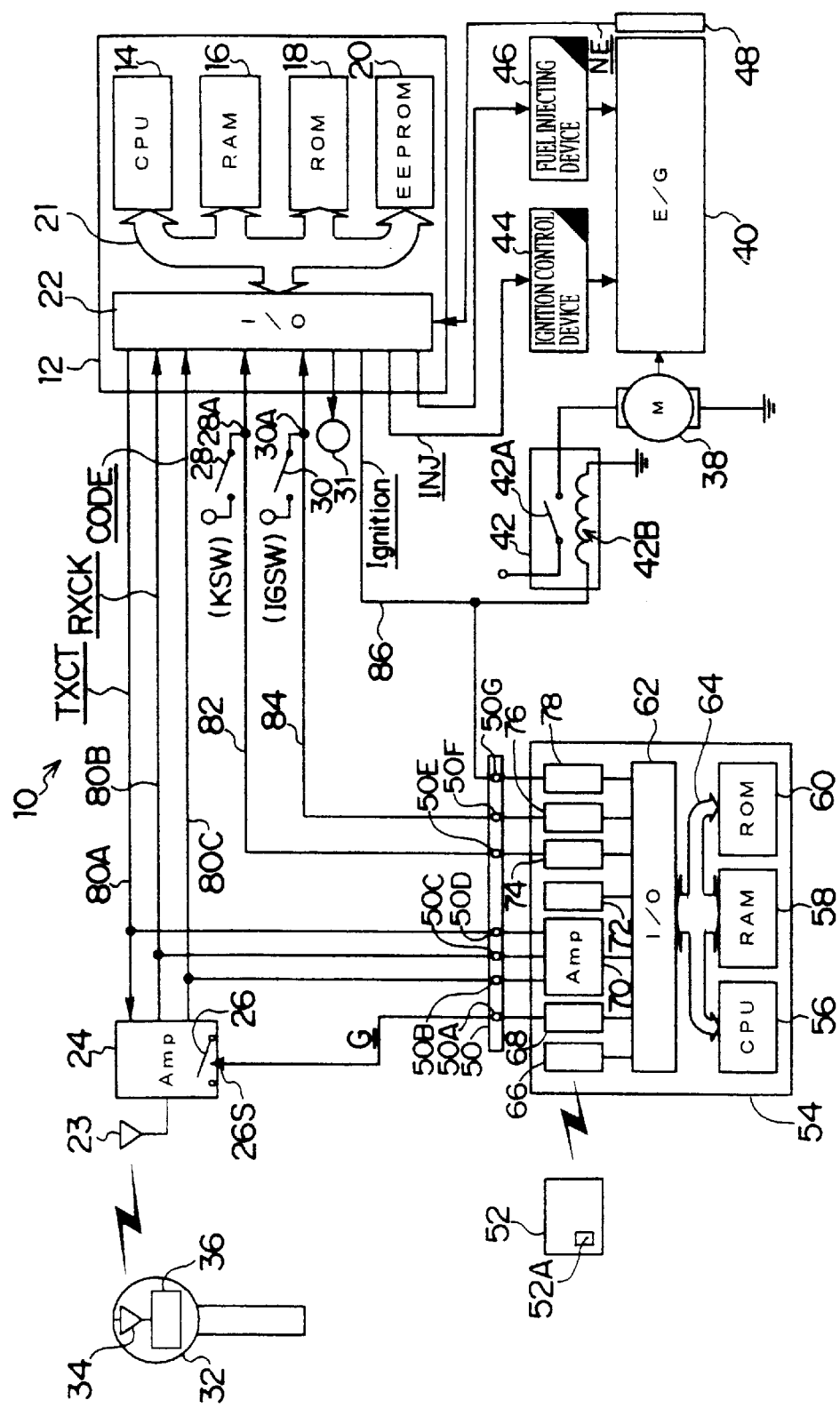
FIG. 1 is a block diagram which shows the schematic structure of a stealing preventing apparatus for a vehicle relating to the present invention.

As shown in FIG. 1, a stealing preventing apparatus 10 for a vehicle includes an imobilizer ECU 12 serving as engine starting permitting means. In the present embodiment, the imobilizer ECU 12 also serves as the ECU of an electronically controlled fuel injector (a so-called EFi) which outputs a signal for driving an engine 40.

When a key means other than a normal ignition key is loaded into a key cylinder, the imobilizer ECU 12 prohibits the starting of the engine (stealing prevention for a vehicle). The imobilizer ECU 12 includes a microcomputer formed by a CPU 14, a RAM 16, a ROM 18, and an input/output port (I/O) 22, which are connected by a bus 21 so that command or data can be delivered and received. Further, the imobilizer ECU 12 includes an EEPROM 20, which serves as code storing means and stores a normal code such as an inherent code or the like of a vehicle key (the detail will be described later), and is connected to the bus 21. The ROM 18 stores a processing routine, which is performed in the imobilizer ECU 12 and will be described later.

A status display 31 such as an LED or the like for displaying the operating state of the imobilizer ECU 12 is connected to the input/output port 22 of the imobilizer ECU 12.

Further, one end of each of signal lines 80A, 80B, 80C is connected to the input/output port 22 of the imobilizer ECU 12, and another end of each of the signal lines 80A, 80B, 80C is connected to an amplifying circuit (Amp) 24 serving as inherent code input means. The signal line 80A is a signal line for outputting an inquiry signal (TXCT) from the imobilizer ECU 12 to the amplifying circuit 24. The signal line 80B is a signal line for inputting a return signal (RXCK) from the amplifying circuit 24 to the imobilizer ECU 12. The signal line 80C is a signal line for inputting an inherent code (CODE) from the amplifying circuit 24 to the imobilizer ECU 12.

In order to deliver and receive an electric wave signal to and from an ignition key 32, the amplifying circuit 24 amplifies a signal from the imobilizer ECU 12 or a signal from the ignition key 32. The amplifying circuit 24 includes a prohibitive switch 26 for prohibiting an operating state of the amplifying circuit 24, itself. The prohibiting state of the amplifying circuit 24 is a state in which the amplifying circuit 24 does not operate practically and can be accomplished cutting off the power supply to the amplifying circuit 24, for example. The prohibitive switch 26 includes a control end 26S that operates when a prohibitive signal G is input to the control end 26S. The operation of the amplifying circuit 24, itself, is thus prohibited in response to the prohibitive signal G.

Moreover, an antenna 23, which sends and receives a signal to and from the ignition key 32, is connected to the amplifying circuit 24. The amplifying circuit 24 and the antenna 23 form inherent code input means. The antenna 23 is mounted to an unillustrated key cylinder for inserting the ignition key 32. As is known, after the ignition key 32 is inserted into the unillustrated key cylinder, the key cylinder is rotatable. Within the key cylinder, there are various types of switches, such as an accessory switch for turning on and off the power source of an accessory equipment, an ignition switch for turning on and off the power source of an ignition plug or the like, and a starter switch for turning on and off the power source of a starter motor. One end 30A of an ignition switch (IGSW) 30 is connected to the input/output port 22 of the imobilizer ECU 12 and the other end thereof is connected to a battery power source. When the ignition switch 30 is turned on, a high level signal is input to the input/output port 22. Further, in the present embodiment, a key switch (KSW) 28, which detects the insertion of the ignition key 32, is attached to an unillustrated key cylinder. One end 28A of the key switch 28 is connected to the input/output port 22 of the imobilizer ECU 12 and the other end thereof is connected to a battery power source. When the key switch 28 is turned on, a high level signal is input to the input/output port 22.

An ignition control device 44, which controls the ignition of the engine 40, and a fuel injecting device 46, which controls the supply of fuel to the engine 40, are connected to the engine 40 disposed on the vehicle. The ignition control device 44 and the fuel injecting device 46 are connected to the input/output port 22 of the imobilizer ECU 12. Moreover, a revolution number detecting device 48, which detects the number of revolutions NE of the engine 40, is attached to the engine 40. The revolution number detecting device 48 is connected to the input/output port 22 of the imobilizer ECU 12. Further, a starter motor 38 is connected to the engine 40. The starter motor 38 is connected to a battery power source via a relay 42. The relay 42 is formed by a switch 42A and a coil 42B. One end of the switch 42A is connected to the battery power source. The switch 42A is turned on and off by energizing the coil 42B. One end of the coil 42B is connected to the input/output port 22 of the imobilizer ECU 12 via a signal line 86 and the other end thereof is grounded.

The ignition key 32 of the present embodiment includes a transponder 36 recording an inherent code, which indicates that the ignition key 32 is a normal vehicle key of an unillustrated vehicle. The transponder 36 includes a power source circuit, an inherent code recording portion, a reading portion, and a transmitting portion, which are unillustrated. Further, a key antenna 34 is connected to the transponder 36. When the transponder 36 receives a predetermined electric wave from outside, the electric wave is received by the key antenna 34 and supplied to the power source circuit. The power source circuit obtains electric power from the received electric wave and supplies the power to an internal circuit. An inherent code recorded at the inherent code recording portion is read and the read inherent code is transmitted from the key antenna 34 via a transmitting circuit.

The amplifying circuit 24, which is connected to the above-structured antenna 23, the imobilizer ECU 12, and the revolution number detecting device 48 form the stealing preventing apparatus for a vehicle of the present embodiment.

The above-described stealing preventing apparatus for a vehicle includes a harness 50 serving as signal input means. The harness 50 includes a group of terminals for connecting a remote engine starting device 54, which serves as engine start requesting means, to the stealing preventing apparatus for the vehicle and includes a plurality of terminals 50A to 50G. The terminal 50A of the harness 50 is connected to the control terminal 26S of the prohibitive switch 26. Further, terminals 50B, 50C, 50D are respectively connected to signal lines 80C, 80B, 80A. A terminal 50E is connected to the end 28A of the key switch 28 via a signal line 82, and a terminal 50F is connected to the end 30A of the ignition switch 30 via a signal line 84. Moreover, a terminal 50G is connected to a signal line 86.

The remote engine starting device 54 is connected to the harness 50. Without using an ignition key, the remote engine starting device 54 starts the engine 40 by using a remote switch 52, which serves as remote operating means. The remote engine starting device 54 includes a microcomputer formed by a CPU 56, a RAM 58, a ROM 60, and an input/output (I/O) port 62, which are connected by a bus 64 so that command or data can be delivered and received. The ROM 60 stores a processing routine, which will be described later and is performed by receiving the engine start designation signal from the remote switch 52. Further, the remote switch 52 includes a designation switch 52A, an unillustrated transmitting circuit and the like. As the designation switch 52A is pressed, the designation signal for starting the engine 40 is transmitted from the remote switch 52.

The remote engine starting device 54 includes a remote transponder 72, which serves as key code storing means and whose structure is similar to that of the transponder 36 built in the above-described ignition key 32. A key code, which corresponds to the inherent code recorded onto the ignition key 32, is stored in advance in the remote transponder 72. The remote transponder 72 is connected to the amplifying circuit 70 whose structure is similar to that of the aforementioned amplifying circuit 24. One input/output portion of the amplifying circuit 70 at the interior of the device is connected to an input/output port 62, and three input/output portions thereof at the exterior of the device are connected to the terminals 50B, 50C, 50D of the harness 50.

Further, a receiver 66 for receiving a signal from the remote switch 52, which transmits the engine start designation signal from a remote place, is connected to the input/output port 62 of the remote engine starting device 54. Moreover, the terminal 50A of the harness 50 is connected to the input/output port 62 via a driver 68. Furthermore, the terminals 50E, 50F, 50G of the harness 50 are connected to the input/output port 62 via drivers 74, 76, 78.

The EEPROM 20 of the above imobilizer ECU 12 is a ROM which can be written and deleted electrically, and in which the normal code, such as the inherent code or the like of the vehicle key, is stored or updated. As shown in FIG. 2, the capacity of the EEPROM 20 is secured so that three inherent codes can be stored therein. No. 1 inherent code CODE_A contains an inherent code recorded onto the ignition key 32, which serves as a master key, and is recorded in advance when the ignition key 32 is manufactured. The inherent code CODE_A may be recorded by an initial registration processing. No. 2 inherent code CODE_B and No. 3 inherent code CODE_C are prepared for storing a spare code so that a user can additionally register a sub-key or a key code of the remote engine starting device 54, to be described later. In the present embodiment, three codes can be stored in the EEPROM 20 as normal codes, however, two codes or four or more codes may be stored therein.

Next, the operation of the present embodiment will be explained.

At first, the registration processing, which is performed in the imobilizer ECU 12, of the inherent code to the EEPROM 20 will be explained. In the present embodiment, the registration processing effected by using the ignition key 32, which serves as a master key, will be explained.

When the power source is supplied to the imobilizer ECU 12, a processing routine in FIG. 3 is carried out and the process proceeds to step 100. In step 100, the number of revolutions NE of the engine 40 detected by the revolution number detecting device 48 is read, and in a subsequent step 102, a determination is made as to whether NE<500 (rpm). When NE<500, it is determined that a vehicle is stopped. Thus, the answer to the determination in step 102 is "Yes", and the process proceeds to step 104. On the other hand, when NE≧500, it is determined that a vehicle is not stopped. Thus, the answer to the determination in step 102 is "No" and the process goes to step 116. In step 116, a termination processing is executed and then the present routine ends. In the termination processing, it can be confirmed by turning on/off the status display 31 or the like that the operating state of the imobilizer ECU 12 to the registration processing has been completed. In the above-described step 102, it may be judged that a vehicle is stopped by detecting a brake switch.

In step 104, a signal level from the key switch (KSW) 28 is read. In a subsequent step 106, a determination is made as to whether the key switch 28 outputs a high level signal, and thereby, a determination is made as to whether the vehicle key is inserted into an unillustrated key cylinder. When the vehicle key is not inserted into the key cylinder, the following registration processing cannot be performed. Accordingly, after the termination processing is carried out in step 116, the present routine ends. On the other hand, when the vehicle key is inserted into the key cylinder, the answer to the determination in step 106 is "Yes" and the process proceeds to a subsequent step 108.

In the next step 108, a determination is made as to whether registration operation is performed. In the registration operation, a user designates the transition of the inherent code to the registration processing and, for example, the user may repeat stepping-on/off of a brake pedal predetermined times. At the time of determining as to whether the registration operation is effected in step 108, it is preferable that the transition of the operating state of the imobilizer ECU 12 to the registration processing be notified to the user by lighting or the like the status display 31. When the registration operation is not performed by the user and the answer to the determination in step 108 is "No", the termination processing is effected in step 116 and the present routine ends. On the other hand, when the registration operation is effected, the answer to the determination in step 108 is "Yes" and the process goes to step 110.

In step 110, a code reading processing is performed as follows. In a subsequent step 112, a checking processing for checking whether the inserted key is a master key is effected by using the read code.

In the code reading processing, firstly, an inquiry signal (TXCT) is output to the signal line 80A and then to the amplifying circuit 24. Next, a return signal (RXCK) is output from the amplifying circuit 24 to the signal line 80B and is then input to the imobilizer ECU 12. Together with the return signal, an inherent code (CODE) recorded onto the ignition key 32 is output from the amplifying circuit 24 to the signal line 80C. In this way, the inherent code (CODE) recorded onto the ignition key 32 is input to the imobilizer ECU 12. In step 110, the input inherent code (CODE) is read.

In the checking processing, firstly, the normal code (see FIG. 2) stored in the EEPROM 20 of the imobilizer 12 is read. The EEPROM 20 contains the inherent code recorded onto the ignition key 32, which serves as a master key, as the No. 1 inherent code CODE_A. Accordingly, in step 112, the code CODE_A read from the EEPROM 20 and the inherent code (CODE) read in step 110 are compared and checked by determining as to whether the codes match. When the codes match, it is confirmed that the checking is correctly carried out.

In a subsequent step 114, on the basis of the results of checking in step 112, i.e., by determining as to whether the confirmation is made, a determination is made as to whether the master key is inserted into the key cylinder. When the confirmation is not made in step 112, the answer to the determination in step 114 is "No". The termination processing is effected in step 116, and thereafter, the present routine ends. On the other hand, when the confirmation is made in step 112, the process goes to step 118.

In step 118, in order to avoid the starting of the engine during the registration processing, a signal which does not permit starting of the engine, i.e., a signal which prohibits starting of the ignition control device 44 and the fuel injecting device 46, or a signal which maintains the current state of the engine is output. In a subsequent step 120, the process moves to the registration processing by the master key, and in order to urge the replacement of the vehicle key which is additionally registered or the registration of the remote engine starting device, the status display 31 is turned on and off for a predetermined time.

In a subsequent step 122, a code reading processing is effected in the same way as the aforementioned step 110. In step 122, when the status display 31 is turned on and off for a predetermined time, the code of the replaced vehicle key or the code of the remote engine starting device is read. Namely, in step 122 of the code reading processing, at first, an inquiry signal (TXCT) is output to the signal line 80A. In this way, the inquiry signal is output to the amplifying circuit 24 or to the amplifying circuit 70 of the remote engine starting device 54 via the harness 50. Next, a return signal (RXCK) is output to the signal line 80B from the amplifying circuit 24 or the amplifying circuit 70 of the remote engine starting device 54 via the harness 50 and is input to the imobilizer ECU 12. Together with the return signal, the inherent code (CODE) recorded onto the ignition key 32 is output from the amplifying circuit 24 to the signal line 80C, or the key code (CODE) corresponding to the inherent code is output from the amplifying circuit 70 of the remote engine starting device 54 via the harness 50 to the signal line 80C. In the remote engine starting device 54, the key code is output as an inherent code by a processing, which will be described later.

In a subsequent step 124, a determination is made as to whether a code is input via the signal line 80C. When the answer to the determination in step 124 is "No", the process goes to step 126 where a determination is made as to whether a predetermined time has passed. Within the predetermined time, the process returns to step 122. When the predetermined time has passed, the termination processing is effected in step 116 and the present routine ends.

On the other hand, when the answer to the determination in step 124 is "Yes", the registration processing is effected in step 128. In the registration processing, the read code is written to an area which is vacant and which stores the spare code prepared in advance in the EEPROM 20 of the imobilizer ECU 12. In step 128, if the codes are registered in all of the areas for storing the spare code and there is no vacant area, a final code (No. 3 code) is rewritten. In a subsequent step 130, in order to indicate the completion of the registration, the status display 31 is lit for a predetermined time, and the process returns to step 104. In step 130, when the other vehicle key is registered again, it is necessary to insert the master key. Thus, it is preferable that the status display 31 be also lit for indicating the urging of the second insertion of the master key (the replacement of the key).

In this way, the inherent code of the key other than the ignition key 21 or the key code of the remote engine starting device 54 is able to be stored in the EEPROM 20 as a normal code.

Next, the operation of the remote engine starting device 54 will be explained.

When a power source is supplied to the remote engine starting device 54, a processing routine in FIG. 4 is executed. As a user presses a designation switch 52A of the remote switch 52, an indication signal for starting the engine 40 is sent from the remote switch 52. In step 200, the receiver 66 is read until the signal is received. When the signal is received and the answer to the determination in step 202 is "Yes", in a subsequent step 204, a prohibitive signal is output. The signal is a prohibitive signal G for prohibiting the operation of the amplifying circuit 24 itself and is output to the control end 26S of the prohibitive switch 26 via the driver 68 and the terminal 50A of the harness 50. When the prohibitive signal G is input to the control end 26S, the operation of the amplifying circuit 24 is prohibited. Therefore, the remote engine starting device 54 is the only device in which a signal can be delivered to and received from the imobilizer ECU 12.

In a subsequent step 206, a KSW-on-signal which corresponds to the turning-on of the key switch (KSW) 28 is output to the signal line 82. In a subsequent step 208, a determination is made as to whether a signal from the imobilizer ECU 12 is received. When the signal is received, the process proceeds to a subsequent step 210. Step 208 is effected by determining as to whether the inquiry signal (TXCT) from the signal line 80A is input to the amplifying circuit 70 via the terminal 50D of the harness 50.

In a subsequent step 210, the key code is output. Namely, when the amplifying circuit 70 receives the inquiry signal (TXCT) from the imobilizer ECU 12, the signal is output to the transponder 72. The transponder 72 reads the key code corresponding to the inherent code recorded onto a key code recording portion and transmits the read inherent code to the amplifying circuit 70. The structure of the transponder 72 is similar to that of the transponder 36 built in the ignition key 32. The transponder 72 includes a key code recording portion and contains a key code corresponding to the inherent code, which indicates that the ignition key 32 is a normal vehicle key. Therefore, similar to the aforementioned amplifying circuit 24, a return signal (RXCK) is output from the amplifying circuit 70 to the signal line 80B and is then input to the imobilizer ECU 12. Together with the return signal, a key code (CODE) recorded onto the transponder 72 is output from the amplifying circuit 70 to the signal line 80C. In this way, a key code (CODE) corresponding to the inherent code recorded onto the ignition key 32 is input to the imobilizer ECU 12.

Next, in step 212, a high level IGSW-on-signal corresponding to the turning-on of the ignition switch 30 by the ignition key 32 is output to the signal line 84. In a subsequent step 214, a starter starting signal serving as a request signal is output to the signal line 86. In this way, the relay 42 is operated, i.e., the coil 42B is energized and the switch 42A is turned on, the power supply from the battery power source to the starter motor 38 is started. In this way, the starter motor 38 is operated and the engine 40 is started.

Even if a signal is output in step 212 and step 214 during the registration processing (FIG. 3), because the starting of engine is prohibited, the engine will not be started.

Next, a description will be given of a processing performed in the imobilizer ECU 12 after the registration processing (FIG. 3) of the inherent code to the EEPROM 20 is effected.

Figure 5:
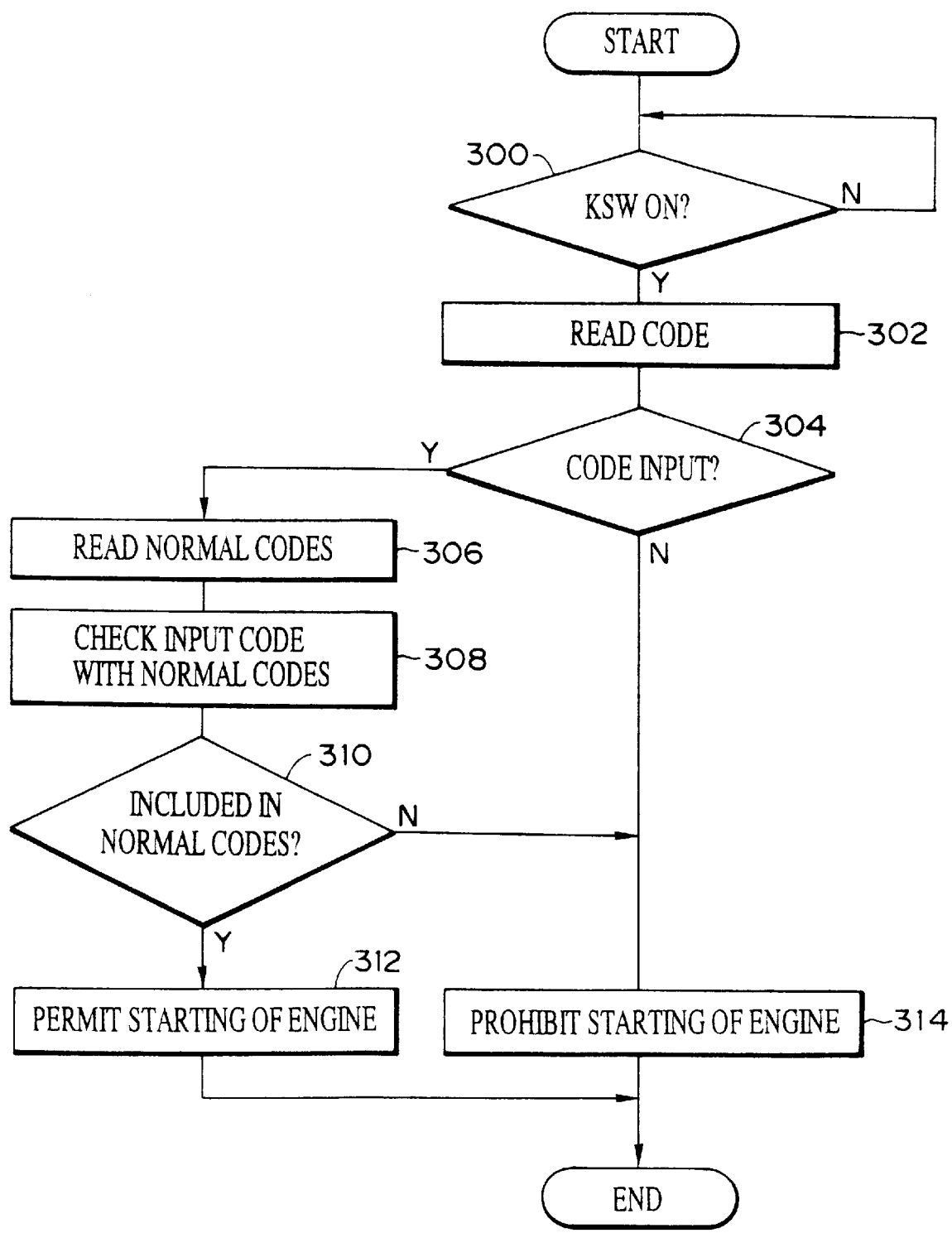
FIG. 5 is a flowchart which shows the flow of processing of an imobilizer ECU.

When the power source is supplied to the imobilizer ECU 12 and the engine 40 is stopped, a processing routine shown in FIG. 5 is performed and the process goes to step 300. In step 300, as the signal from the signal line 82 is read, a determination is made as to whether the key switch (KSW) 28 is turned on or whether a KSW-on-signal which corresponds to the turning-on of the key switch 28 is output. When the answer to the determination in step 300 is "Yes", the process goes to step 302. In step 302, a code reading processing is performed in the same way as the processing in step 122 in FIG. 3. Namely, at first, the inquiry signal (TXCT) is output to the signal line 80A and then to the amplifying circuit 24 or the amplifying circuit 70 of the remote engine starting device 54. Next, a return signal (RXCK) is output from the amplifying circuit 24 or the amplifying circuit 70 of the remote engine starting device 54 to the signal line 80B and is then input to the imobilizer ECU 12. Together with the return signal, the inherent code recorded onto the ignition key 32 or the key code corresponding to the inherent code is input from the amplifying circuit 24 or the amplifying circuit 70 of the remote engine starting device 54 to the signal line 80C.

In a subsequent step 304, a determination is made as to whether the code has been input. When the code has not been input, it is determined that the engine is started by a vehicle key, onto which a normal code is not recorded, or by the remote engine starting device, and the answer to the determination in step 304 is "No". In a subsequent step 314, a processing which does not permit the starting of engine is effected and then the present routine ends. In the processing shown in step 314, the starting of the ignition control device 44 and the fuel injecting device 46 is prohibited, or alternatively, a signal which indicates that the engine is moved from the current state to the stopped state is output. On the other hand, when the code has been input in step 302, it is determined that the answer to the determination in step 304 is "Yes". The process goes to step 306.

In step 306, the normal codes (FIG. 2) stored in the EEPROM 20 are read. In a subsequent step 308, the input code is checked with the normal codes. Namely, the EEPROM 20 contains the inherent code recorded onto the ignition key 32 as No. 1 inherent code CODE_A and the inherent code of the sub-key and the key code recorded onto the remote engine starting device 54 as spare codes. Therefore, in step 308, the codes CODE_A to CODE_C read from the EEPROM 20 are compared to the inherent code (CODE) read in step 302. Checking is effected by determining whether the matching codes exist. When the matching codes exist, it is confirmed that the checking is correctly done.

In a subsequent step 310, on the basis of the results of checking in step 308, i.e., by determining whether the confirmation is made, a determination is made as to whether the input code is included in the normal codes. When the confirmation is not made in step 308, the answer to the determination in step 310 is "No". In step 314, the processing which does not permit the starting of engine is carried out, and thereafter, the present routine ends. On the other hand, when the confirmation is made in step 308, the process proceeds to step 312. In step 312, a processing which permits the starting of engine is carried out, and the present routine ends. In the processing which permits the starting of the engine, the starting of the ignition control device 44 and the fuel injecting device 46 is requested, or alternatively, a signal which indicates the starting of engine is output.

Thus, in the present embodiment, the remote engine starting device 54 for designating the starting of the engine by the remote switch includes a transponder onto which a key code corresponding to the inherent code, which is recorded onto the ignition key, was recorded beforehand. Further, the imobilizer ECU 12, which prohibits the starting of an engine or the like when the normal ignition key is not used, includes the EEPROM 20 which can store a plurality of inherent codes. In addition to the storage of the inherent code of the ignition key, in the registration processing, the EEPROM 20 can register the key code stored in the remote engine starting device 54 as a normal code corresponding to the inherent code of the normal vehicle key. Therefore, for the purpose of preventing stealing or the like of the vehicle, in the imobilizer ECU 12 which permits the starting of an engine only when the starting thereof by the vehicle key having the normal code is requested, the key code of the remote engine starting device 54 is stored as the normal code. Thus, even if the ignition key or the normal vehicle key is not inserted into the key cylinder, the engine can be started. As a result, even if the remote engine starting device 54 for starting the engine from a remote place is attached to a vehicle, the security against stealing or the like can be assured.

In the present embodiment, the remote engine starting device is connected to the imobilizer ECU via the harness. However, at the time of manufacturing of a vehicle, the remote engine starting device may be directly connected to the imobilizer ECU or to the amplifying circuit 24 side.

Moreover, in the stealing preventing apparatus for a vehicle of the present embodiment, because the remote engine starting device is connectable to the imobilizer ECU via the harness, after a vehicle is manufactured, a single remote engine starting device can be easily disposed at the apparatus. Further, even in a case in which the remote engine starting device is not connected, since the imobilizer ECU can perform the starting of engine in the processing similar to the conventional processing only when the starting of engine by the vehicle key, onto which the normal code is recorded, is requested, the security can be assured.

Further, an example is given of a case in which the key code corresponding to the inherent code was recorded in advance onto the remote transponder provided at the remote engine starting device. However, the present invention is not limited to the same, the key code may be stored in a storing medium such as a rewritable magnetic card or the like. Further, a master key or a sub-key registered as a normal code may be used for the remote engine starting device. In this case, in order to prevent stealing or the like, it is preferable to provide a key containing portion corresponding to the key cylinder.

As described above, in accordance with the invention described in the first aspect, when the starting of engine of the vehicle is designated from a remote place, the key code corresponding to the inherent code, which should be recorded onto the normal vehicle key, is stored in advance in the code storing means as an inherent code. When the inherent code is included in the stored normal codes, the engine start permitting means can permit the starting of the engine. Therefore, the present invention achieves a superior effect in that, while the security against stealing or the like is assured, the engine can be started from the remote place.

In accordance with the invention described in the second aspect, as the remote operating means designates the starting of engine from a remote place, the engine start requesting means outputs the key code corresponding to the inherent code, which should be recorded onto the normal vehicle key. Therefore, when the inherent code corresponding to the key code is included in the stored normal codes, the present invention achieves a superior effect in that the engine start permitting means can permit the starting of the engine, and that, while the security against stealing or the like is assured, the engine can be started.

What is claimed is:

1. An engine start control apparatus for a vehicle, comprising:

inherent code input means for inputting an inherent code recorded in and output from key means, the inherent code indicating that the key means is a vehicle key corresponding to the vehicle;

signal input means for inputting a key code corresponding to the inherent code and for inputting a request signal for starting the engine of the vehicle, the signal input means being responsive to an engine starting command remote from the vehicle;

code storing means for storing a plurality of codes corresponding to the vehicle, the key code and the inherent code corresponding to the vehicle being stored in said code storing means; and engine start controlling means for determining one of whether the key code input from said signal input means corresponds to the vehicle and to codes stored in said code storing means and whether the inherent code input from said inherent code input means corresponds to the vehicle and to codes stored in said code storing means, and for starting the engine based on the results of the determination.

2. An engine start control apparatus according to claim 1, wherein said signal input means includes operating means remote from the vehicle for commanding starting of the engine, and engine start requesting means disposed on the vehicle, the engine start requesting means outputting, as an inherent code, a key code corresponding to an inherent code recorded onto a vehicle key corresponding to the vehicle, and requesting starting of the engine as commanded by said remote operating means.

3. An engine start control apparatus according to claim 2, wherein said signal input means includes key code storing means, disposed on the vehicle, for storing a key code corresponding to an inherent code recorded onto a vehicle key corresponding to the vehicle, said signal input means outputting the key code stored in said key code storing means.

4. An engine start control apparatus according to claim 3, further comprising:

means for prohibiting the operation of said inherent code input means when the inherent code means indicates a key that does not correspond to the vehicle.

5. An engine start control apparatus according to claim 2, further comprising:

means for prohibiting the operation of said inherent code input means when the inherent code means indicates a key that does not correspond to the vehicle.

6. An engine start control apparatus according to claim 2, wherein said remote operating means is a wireless starting device and said engine start requesting means is a remote engine starting device.

7. An engine start control apparatus according to claim 1, wherein said signal input means includes key code storing means, disposed on the vehicle, for storing a key code corresponding to an inherent code recorded onto a vehicle key corresponding to the vehicle, said signal input means outputting the key code stored in said key code storing means.

8. An engine start control apparatus according to claim 7, further comprising:

means for prohibiting the operation of said inherent code input means when the inherent code means indicates a key that does not correspond to the vehicle.

9. An engine start control apparatus according to claim 1, further comprising:

means for prohibiting the operation of said inherent code input means when the inherent code means indicates a key that does not correspond to the vehicle.

10. An engine start control apparatus according to claim 1, wherein the plurality of codes corresponding to the vehicle can be updated and stored.

* * * * *